United States Patent [19]

Jensen

[11] 3,740,061
[45] June 19, 1973

[54] SEALING ARRANGEMENT FOR IRRIGATION PIPE LINE SECTIONS
[76] Inventor: Arthur E. Jensen, 11372 S.W. Skyline Drive, Santa Ana, Calif.
[22] Filed: Jan. 15, 1971
[21] Appl. No.: 106,794

[52] U.S. Cl. .............. 277/178, 277/DIG. 2, 285/5, 285/231
[51] Int. Cl. ........................... F16j 9/04, F16l 21/02
[58] Field of Search...................... 277/178, 207 A; 285/345, 231, 378, 379, 108, 5

[56] References Cited
UNITED STATES PATENTS
1,873,592  8/1932  James ................................ 285/231

3,173,699  3/1965  Nathan .............................. 277/206

FOREIGN PATENTS OR APPLICATIONS
444,268  3/1936  Great Britain ..................... 277/178
1,159,900  2/1958  France .............................. 285/345

Primary Examiner—Samuel B. Rothberg
Attorney—Frederick C. Mueller

[57]  ABSTRACT

A seal ring of an elastomeric material is formed with a generally J-shaped radial cross-section adapted to be matingly keyed to a bullnosed end of a spigot end of one pipe section to leave a sealing lip or ring portion of the J-ring seal protruding for sealing engagement with the interior surface of a bell end portion of another section of irrigation pipe.

5 Claims, 2 Drawing Figures

PATENTED JUN 19 1973            3,740,061
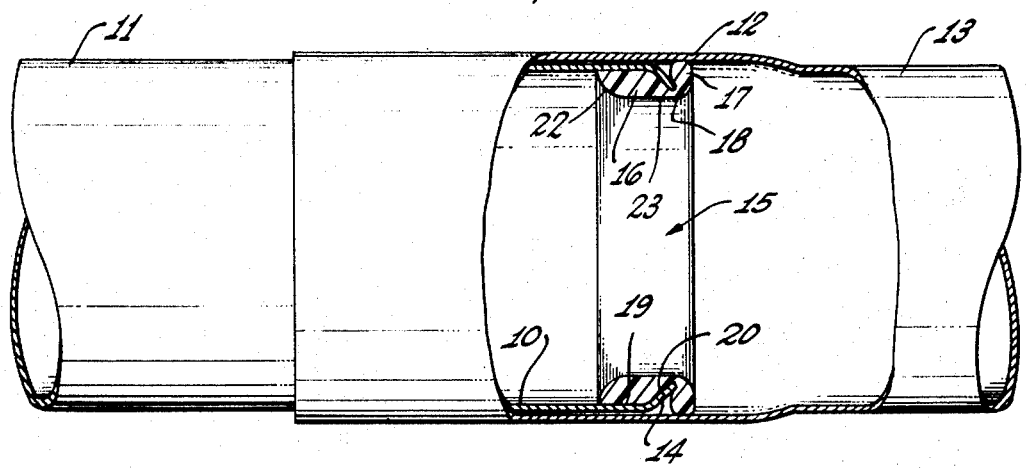
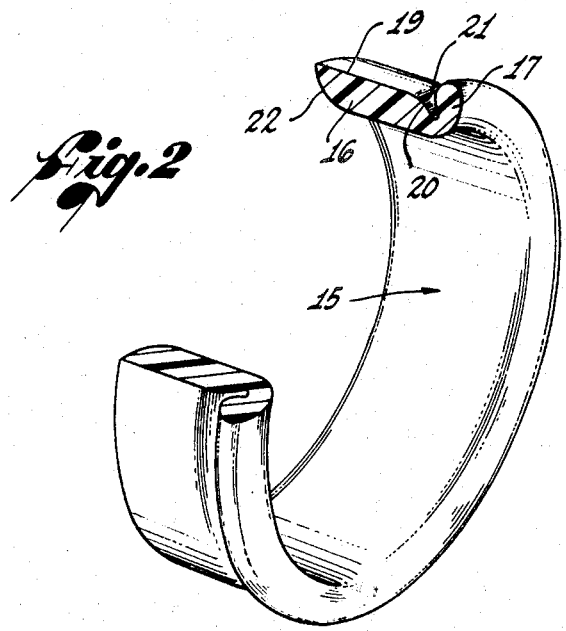
INVENTOR.
ARTHUR E. JENSEN
BY Fulwider, Patton, Rieber, Lee, and Utechi
ATTORNEYS

SEALING ARRANGEMENT FOR IRRIGATION PIPE LINE SECTIONS

BACKGROUND OF THE INVENTION

The present invention relates to a slip joint coupling of the bell and spigot type, the spigot mounting a seal ring that is insertable into and withdrawable from the bell end along with the spigot.

Irrigation pipelines are typically made up of relatively long lengths of pipe. For example, thirty foot lengths of pipe may be joined together and rested directly on the ground or on wheel supports. Pipelines are usually dismantled for seasonal storage and, in the case of ground supported lines, the pipe sections must be taken apart to relocate the line in an unirrigated area of the field after completion of irrigation of one area. Additionally, in the case of wheel-move lines, it may be necessary to move a line from one field to another, also creating an occasion for dismantling the line.

Under these circumstances, it is desirable to have a coupling means which permits easy assembly and disassembly of the pipe sections and which also provides a positive water seal for the coupled sections. Conventional couplings have not been successful in meeting both of these requirements. Thus, while coupling arrangements which initially permit quick assembly and disassembly of the pipe ends have been known, they have not provided effective waterproofing when joined, allowing the entry of sand, grit or other foreign material between the overlapped pipe sections. The accumulation of such foreign material has in some instances made it impossible to separate a coupled pair of pipes short of physically deforming the pipe ends. Some other prior arrangements provide effective water seals once joined but rely on large degrees of interference between the seal and pipes, strongly inhibiting assembly and disassembly of the pipe sections. Additionally, the large degree of interference involves undue abrasion of the seal ring, leading to a very short service life with the consequent necessity of frequent seal ring replacement.

BRIEF DESCRIPTION OF THE DRAWING

FIG. 1 is a partial elevational view, partly in section, of the presently preferred embodiment of the invention.

FIG. 2 is a cutaway perspective view, on a larger scale, of the preferred form of the seal ring of this invention.

DESCRIPTION OF THE PREFERRED EMBODIMENTS

Referring to FIG. 1, there are shown a spigot end 10 of one length of irrigation pipe 11 and a bell end 12 of another length of irrigation pipe 13, the bell and spigot being telescopically joined. While not shown, it will be understood that the pair of pipes 11 and 13 may comprise portions of a ground-supported irrigation line or, alternatively, of a wheel-move irrigation line. In the latter event, the bell end 12 of the pipe section 13 may also comprise the hub portion of a wheel.

The spigot end 10 terminates in a bullnose 14 comprising a radially inwardly directed circumferential flange. The bullnose 14 may be a conical section or of a curved or arcuate radial cross section, but in either event is adapted for a mating or somewhat keylocking engagement with the outer surface of a seal ring 15 that is of a generally J-shaped radial cross section.

The seal ring 15 comprises a body portion 16, of generally cylindrical overall configuration and adapted to be mounted within the spigot 10, and an annular sealing lip portion 17 adapted for sealing contact with the inner surface of the bell end 12. The portions 16 and 17 of the seal ring 15 are joined by a relatively thin-walled portion 18 whereby the sealing lip portion 17 is readily deformable relative to the body portion.

More specifically, the body portion 16 has a cylindrically shaped outer face 19 of a diameter preferably adapted to give a slight interference with the inner surface of the spigot 10. The surface merges into a radially inwardly curved or flared portion 20 in the direction toward the sealing lip 17, preferably shaped complementarily to the inner surface of the bullnose 14. The sealing lip 17, in radial cross section, defines a major portion of a circle of a maximum diameter preferably adapted for a slight interference fit with the inner surface of the bell end 12, although a close sliding fit is acceptable. That face of the sealing lip 17 confronting the radially inwardly directed surface 20 defines an annular pocket 21 in which the bullnose 14 is keyed when the seal ring 15 is mounted in place.

The seal ring 15 is preferably made of neoprene although other elastomeric sealing materials may be employed. In any event, it will be appreciated that with the key-locking arrangement just described the seal ring 15 is securely indexed against axial movement relative to the spigot 10 and is carried by the spigot during insertion and withdrawal of the spigot inwardly and outwardly of the bell end 12. Additionally, it will be noted that by virtue of the thin-walled section 18 of the seal ring the sealing lip portion 17 is readily radially compressible. Accordingly, the maximum diameter of the sealing lip 17 may be made sufficiently large to provide a large degree of interference relative to the inner diameter of the bell end 12 for more effective sealing.

On its inner surface, the seal ring 15 is formed at that axial end opposite to the seal lip 17 with a tapered or curved portion 22 that merges into a cylindrical section 23 that, in turn, merges into the surface of the sealing lip 17. As will be apparent, this configuration is adapted to minimize turbulence in the water passing through the seal ring 15 while, at the same time, a diameter of the cylindrical section is selected to give a sufficient degree of flexibility in the area 18 to permit the desired deflection of the sealing lip 17 and to provide a relatively rigid body portion 16.

It will be observed that the arrangement of this invention eliminates the presence of a bead in the bell end, such as is usually provided for conventionally designed gaskets or O-rings. As a result, the bell end 12 is considerably stronger and accordingly well adapted to serve as the hub of a wheel.

When the spigot 10 and bell end 12 are joined and water under pressure is admitted to the line, the fluid pressure deflects the sealing lip 17 into firm sealing engagement with the inner surface of the bell end 12. As is apparent, the pressure of the water tight seal is directly proportionate to the pressure of the flowing water thereon. With this arrangement, sand, grit and other foreign material entrained in the water is effectively prevented from entering into the area between the outer surface of the spigot 10 and the overlapped inner surface of the bell end 12, avoiding buildup of foreign material commonly found in prior constructions with the consequent difficulty of disjointing the coupled pipe sections.

From the foregoing it will be seen that the invention provides a simple and effective slip coupling for irrigation pipeline sections having an effective seal against entry of foreign material into the overlapped bell and spigot ends, thus facilitating quick assembly and disassembly of the pipe sections. While a presently preferred specific embodiment of the invention has been disclosed and described in detail, it will be understood that variations may be devised without departing from the principles disclosed herein.

I claim:

1. A pipe coupling comprising:
   an imperforate spigot pipe end and a bell pipe end adapted for telescopically mating engagement;
   and an annular seal ring having a body portion and a sealing lip portion;
   said body portion having an external surface of a contour for complementary engagement with the inner surface of said imperforate spigot pipe end;
   said seal ring and said spigot pipe end having matingly engaged portions, at a terminal edge of said spigot pipe end, of smaller diameter than the external diameter of said spigot pipe end for opposing relative axial displacement therebetween;
   said sealing lip projecting axially beyond said spigot pipe end and having a major diameter at least as large as the external diameter of said spigot pipe end for sealing engagement with the interior of said bell pipe end when said two pipe ends are telescopically joined.

2. A coupling as in claim 1 in which said matingly engaged portions include a circumferentially extending radially inwardly flared axial end of said spigot pipe end.

3. A coupling as in claim 1 in which said seal ring includes a circumferentially extending relatively thin-walled portion disposed intermediate said body portion and said sealing lip portion and defining a circular hinge for radial flexing of said sealing lip portion.

4. A coupling as in claim 1 in which
   said matingly engaged portions comprise mating radially inwardly flared portions of said spigot pipe end and of the exterior of said body portion of said seal ring;
   said inwardly flared portion of the exterior of said seal ring and a confronting surface of said sealing lip portion defining a pocket that matingly receives the axial end of said inwardly flared portion of said spigot pipe end to prevent relative axial displacement of said seal ring and said spigot pipe end.

5. A coupling as in claim 4 in which
   said seal ring includes a circumferentially extending relatively thin-walled portion disposed intermediate said body portion and said sealing lip portion and defining a circular hinge for radial flexing of said sealing lip portion;
   said thin-walled portion being defined opposite to said pocket.

* * * * *